(12) United States Patent
Salewski

(10) Patent No.: US 12,280,658 B2
(45) Date of Patent: Apr. 22, 2025

(54) DEVICE FOR CLOSING AND RELEASING A POWER CHARGING PORT OF A MOTOR VEHICLE

(71) Applicant: BOS GmbH & Co. KG, Ostfildern (DE)

(72) Inventor: Jürgen Salewski, Wendlingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 57 days.

(21) Appl. No.: 18/354,729

(22) Filed: Jul. 19, 2023

(65) Prior Publication Data
US 2024/0025245 A1 Jan. 25, 2024

(30) Foreign Application Priority Data

Jul. 20, 2022 (DE) .......................... 102022207400.9

(51) Int. Cl.
*B60K 15/05* (2006.01)
(52) U.S. Cl.
CPC ...... *B60K 15/05* (2013.01); *B60K 2015/0523* (2013.01)
(58) Field of Classification Search
CPC .......................... B60K 15/05; B60K 2015/0523
USPC ..................................................... 296/97.22
See application file for complete search history.

(56) References Cited

U.S. PATENT DOCUMENTS

| 2013/0076059 A1* | 3/2013 | Zalan ...................... B60L 53/16 49/386 |
| 2022/0134874 A1* | 5/2022 | Tanaka ................... B60K 15/05 296/97.22 |

FOREIGN PATENT DOCUMENTS

| DE | 102020209609 A1 | 12/2021 | |
| WO | WO-2020182326 A1 * | 9/2020 | ............... B60K 1/04 |

OTHER PUBLICATIONS

WO-2020182326-A1 (Beck et al.) (Sep. 17, 2020) (Machine Translation) (Year: 2020).*

* cited by examiner

*Primary Examiner* — Mahmoud Gimie
(74) *Attorney, Agent, or Firm* — FLYNN THIEL, P.C.

(57) ABSTRACT

Device for closing and releasing a power charging port of a motor vehicle having a cover part moveable by a guiding mechanism, fixed to the vehicle in an installed and ready to operate condition, between a closed position closing the power charging port and an open position releasing the power charging port. An emergency actuation device moves the cover part into the open position, and a drive mechanism controls movement of the cover part. A coupling mechanism activates the emergency actuation device and deactivates the drive mechanism, and is connected to the emergency actuation device. The coupling mechanism is associated with a mechanical securing mechanism, which cooperates with the emergency actuation device. When the emergency actuation device is deactivated, the securing mechanism produces an additional form fit to secure a power transmission of the drive mechanism. The additional form fit is lifted upon activating of the emergency actuation device.

8 Claims, 10 Drawing Sheets

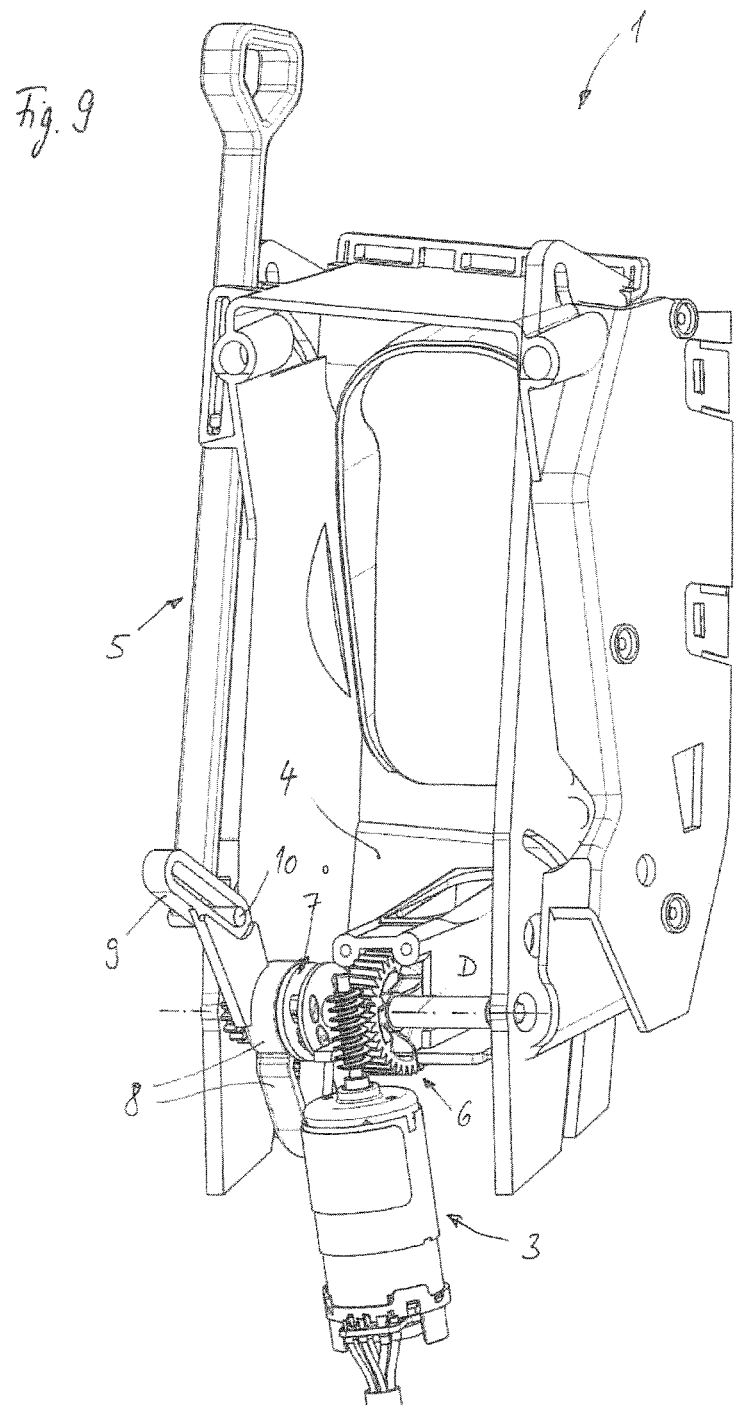

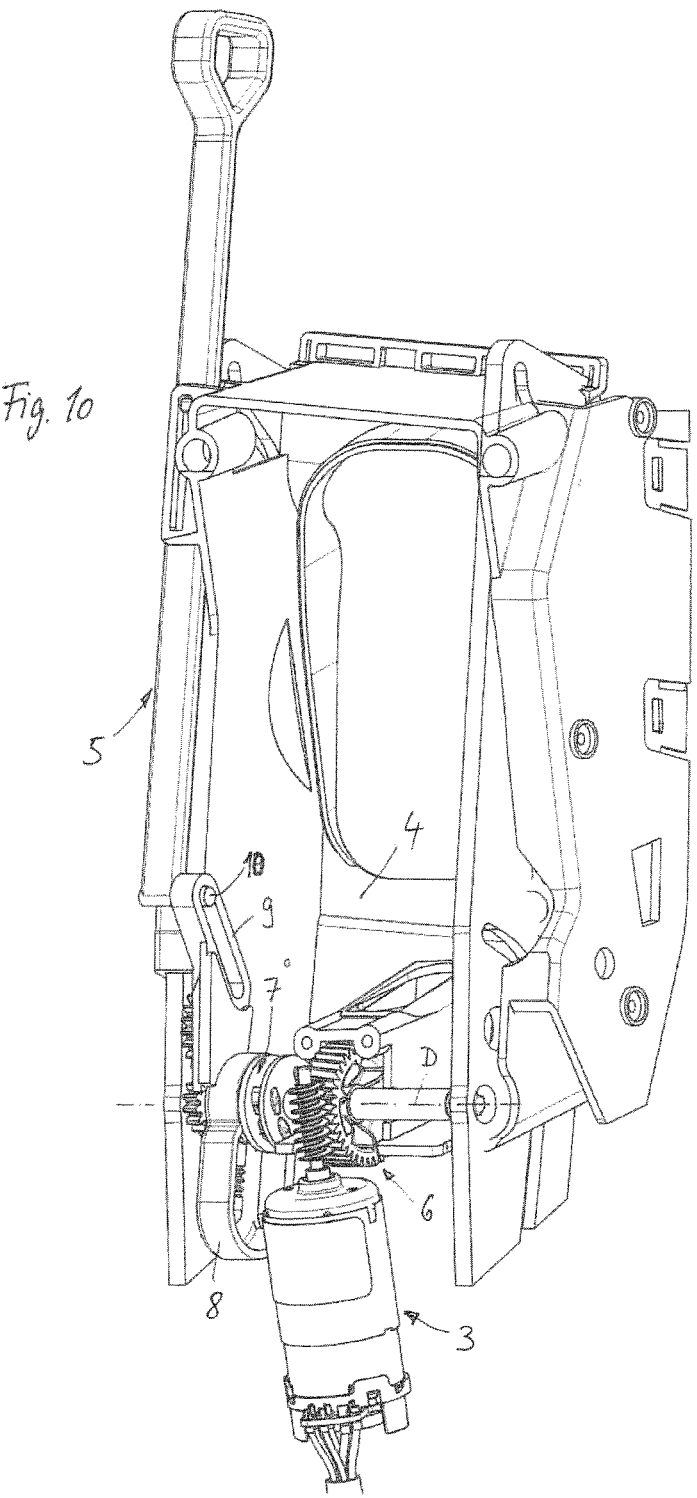

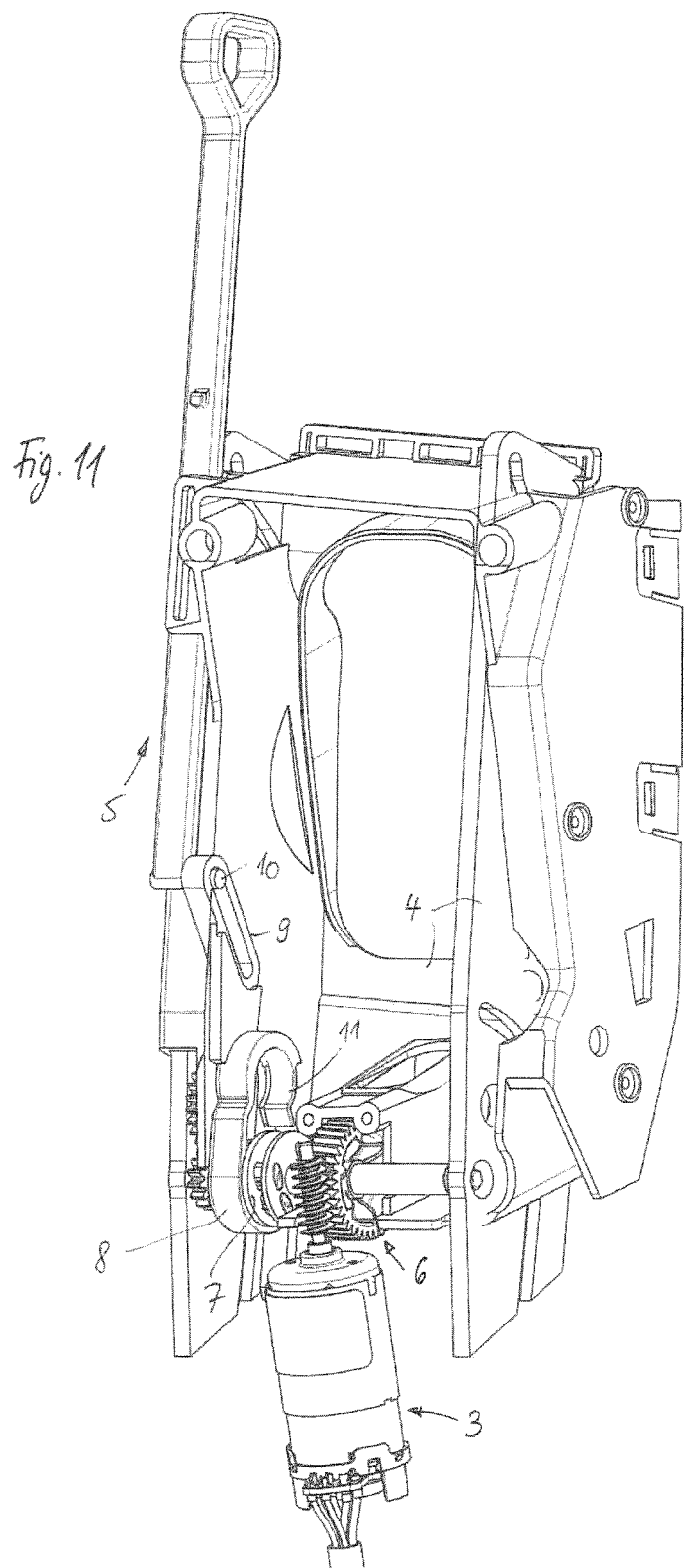

DEVICE FOR CLOSING AND RELEASING A POWER CHARGING PORT OF A MOTOR VEHICLE

CROSS-REFERENCE TO RELATED APPLICATION

This claims priority from German Application No. 10 2022 207 400.9, filed Jul. 20, 2022, the disclosure of which is hereby incorporated by reference in its entirety.

TECHNICAL FIELD

The invention relates to a device for closing and releasing a power charging port of a motor vehicle, having a cover part, which can be moved by means of a guiding mechanism fixed to the vehicle in an installed and ready to operate condition between a closed position closing the power charging port and an open position releasing the power charging port. The device additionally includes a manually operable emergency actuation device for moving the cover part into the open position, a drive mechanism for the powered control of the movement of the cover part between the closed position and the open position, and a coupling mechanism for activating the emergency actuation device and for deactivating the drive mechanism, wherein the coupling mechanism is mechanically and operatively connected to the emergency actuation device.

BACKGROUND AND SUMMARY

A device of this kind for the closing and releasing of a power charging port of a motor vehicle is known from DE 10 2020 209 609 A1. The power charging port has a depression in the area of an outer skin of a vehicle chassis, which can be closed by a cover part. The cover part is movably guided on a guiding mechanism fixed to the chassis between a closed position, in which the cover part closes the depression, and an open position, in which the cover part opens up the depression. An electric drive mechanism is provided for the movement of the cover part. The drive mechanism is associated with a coupling mechanism, which can be moved by means of a manual activation of an emergency actuation device between a coupling state, in which the drive motor is operatively connected by means of the coupling mechanism to the cover part, thereby transmitting force and motion to it, and a separation state, in which the operative connection between the drive mechanism and the cover part is broken.

The problem which the invention addresses is to create a device of the kind mentioned above which makes possible a secure functioning of the emergency actuation device regardless of the weather conditions.

This problem is solved in that the coupling mechanism is associated with a mechanical securing mechanism, which cooperates with the emergency actuation device such that, when the emergency actuation device is deactivated, the securing mechanism produces an additional coupling form fit to secure a power transmission of the drive mechanism, wherein the additional coupling form fit is lifted upon activating of the emergency actuation device.

The solution according to the invention makes sure that no unintentional opening of the coupling mechanism can occur. This assures a functional security, even when large forces are acting on the coupling mechanism. In the prior art, the situation could occur where, because of ice formation on the cover part, very large loads could be acting on the coupling mechanism, which could not be neutralized by the grip of the known emergency actuation device. Thus, the function of the drive mechanism for opening the cover part was no longer assured. According to the invention, good functional security is assured, since in normal operation of the drive mechanism it is ensured that the emergency actuation device remains deactivated. Thus, the drive mechanism can also transmit large driving forces without the coupling mechanism being unintentionally disabled, such as is the case in the prior art. The solution according to the invention is provided for all kinds of motor vehicles having at least one power charging port. The power charging port can be both a connecting nozzle for gasoline refueling and a connecting nozzle for hydrogen refueling and an electrical power connection for charging a vehicle energy carrier with electrical energy. The cover part closes the power charging port preferably flush with an outer chassis skin of the motor vehicle. Preferably, the power charging port is provided in a depression of the vehicle chassis, so that the cover part in the closed position covers the depression of the vehicle chassis in a flush manner. The cover part on the one hand serves as protection against unauthorized use of the power charging port and on the other hand as protection of the power charging port against weather-related factors such as rain, snow, ice or the like.

In one embodiment of the invention, the emergency actuation device and the securing mechanism are arranged movably relative to each other in order to produce or release the additional securing by the securing mechanism. Preferably, either the emergency actuation device or the securing mechanism is fixed in position and the other respective functional device, i.e., the securing mechanism or the emergency actuation device, is arranged movably relative to this.

In another embodiment of the invention, the securing mechanism is fixed in place and the emergency actuation device is mounted movably between the activation position and the deactivation position. This is an especially advantageous configuration, since the emergency actuation device is manually operable in any case and therefore it needs to be moved manually in the event of a failure of the drive mechanism in order to produce an opening of the cover part. With such a movement, the securing mechanism is thus automatically deactivated, so that the emergency actuation device can take over the corresponding opening function of the cover part.

In a further embodiment of the invention, the emergency actuation device comprises a clamping housing which encloses the coupling mechanism in a force-limited manner, being mounted able to swivel about a coupling axis of rotation, and the clamping housing is coupled to a manually graspable activating element, in order to exert a swivel movement on the clamping housing. The swivel movement of the clamping housing on the one hand results in a deactivating of the securing mechanism and on the other hand in the activating of the emergency actuation device, since the swivel movement brings the clamping housing of the emergency actuation device into an activating state in which, upon further manual activation of the emergency actuation device, an uncoupling of the drive mechanism from the control of the cover part occurs.

In a further embodiment of the invention, the activating element is coupled by means of a sliding joint to the clamping housing. The sliding joint has a dual function, on the one hand allowing the swivel movement of the clamping housing and on the other hand making possible an opening of the coupling mechanism with a corresponding linear displacement of the activating element. Consequently, the sliding joint forms a push and turn joint, in functional respects.

In a further embodiment of the invention, the sliding joint comprises a connecting link guide, which is oriented at least for a portion at a slant to a lengthwise extension of the clamping housing of the emergency actuation device. The connecting link guide is preferably linear in configuration and extends, in the release position of the clamping housing, in which the coupling mechanism is prepared for an uncoupling of the drive mechanism from the cover part, coaxially to a direction of linear displacement of the activating element.

In a further embodiment of the invention, the clamping housing comprises at least one elastically resilient clamping tab radially enclosing the coupling mechanism for a portion on the outside, and the securing mechanism comprises a securing cam, making contact with the clamping tab radially on the outside such that, in the deactivation position of the emergency actuation device, the clamping tab is blocked by a form fit against a radial expansion to the outside, and, in the activation position of the emergency actuation device, the clamping tab is released for a radial-elastic expansion to the outside. This is an especially simple and functionally secure configuration. A radially outward outer contour of the clamping tab is preferably curved in a circular arc, concentric to the axis of rotation of the coupling mechanism. The securing cam protrudes radially to this axis of rotation from the outside towards the clamping tab.

BRIEF DESCRIPTION OF THE DRAWINGS

FIG. 9 shows, in perspective representation, the device of FIGS. 1 to 8 with the emergency actuation device in the deactivation position, FIG. 10 shows, in perspective representation, the device of FIGS. 1 to 8 with the emergency actuation device moving away from the deactivation position and towards the activation position, and FIG. 11 shows, in perspective representation, the device of FIGS. 1 to 8 with the emergency actuation device in the activation position.

DETAILED DESCRIPTION

Figure 1:
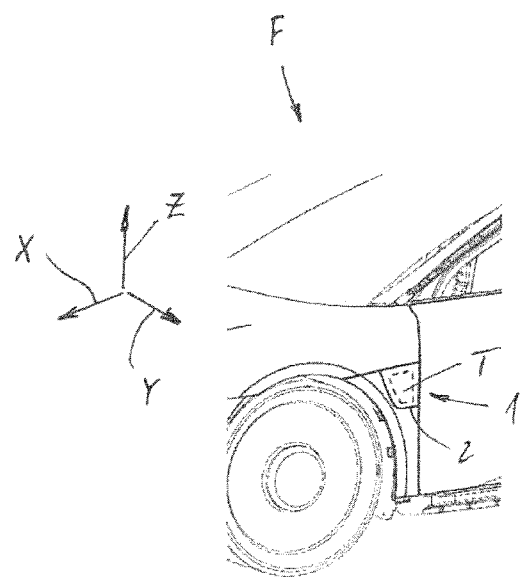
FIG. 1 shows a cutout portion of one embodiment of a device according to the invention in the area of a vehicle chassis of a passenger car and in a closed position of a cover part.

A motor vehicle in the form of a passenger car F includes a vehicle chassis K, which is provided on one chassis side, in the present instance on a left chassis side in the vehicle direction, with a body recess T, comprising a power charging port L. The body recess T and the power charging port L are associated with a device 1 for closing and releasing the power charging port L. The device 1 comprises a cover part 2, which is guided for a linear displacement between a closed position, represented in FIG. 1, and an open position in the vehicle vertical direction (Z-direction in the vehicle coordinate system x-y-z), shown in FIG. 2. A corresponding guiding mechanism for the movement of the cover 2 can be seen in FIG. 3, but is not otherwise designated. A drive mechanism A is provided for the movement of the cover part 2 between the closed position and the open position, comprising an electrical drive motor 3 as well as a transmission 6, which can be seen in FIGS. 9 to 11. The cover part 2 is firmly associated with a toothed rack, which meshes with an output sprocket of the transmission 6 of the drive mechanism A. The construction and function of the device 1, except for the differences described below, are identical to the device according to DE 10 2020 209 609 A1, so that in regard to the disclosure of the construction and function of the device 1 express reference is made in addition to the disclosure of DE 10 2020 209 609 A1.

The cover part 2, as in DE 10 2020 209 609 A1, is oriented in its closed position flush with the sections of the vehicle chassis K surrounding the body recess T. In the open position, the cover part 2 is displaced outward in the vehicle transverse direction Y and downward in the vehicle vertical direction Z. Alternatively, the cover part can be moved upward, inward, as well as forward and/or backward in the vehicle longitudinal direction X, depending on the physical placement of the body recess T and/or the configuration of the corresponding vehicle-fixed guiding mechanism in the open position.

The drive mechanism A comprises an electrical drive motor, which is operatively connected to the cover part 2, transmitting force and motion. The operative connection serves for a transmission of driving forces and/or motions from the drive motor 3 to the cover part 2. For the supplying of electrical operating energy, the electrical drive motor 3 is connected to an onboard electrical network of the motor vehicle F, not otherwise shown.

In event of a disrupted power supply of the drive motor 3 or some other malfunction of the drive mechanism A, a manual movement of the cover part 2 occurs between the closed and the open position by an emergency actuation device, as can be seen in FIGS. 3 to 11. In order to avoid damage or impairment of the device 1, the device 1 comprises a coupling mechanism 7, associated with the drive mechanism A, which can be moved by means of the emergency actuation device between a coupling state and a separation state. In the coupling state, the drive motor 3 is operatively connected by means of the coupling mechanism 7 to the cover part 2, transmitting force and motion. In the separation state, this operative connection is broken.

Figure 2:
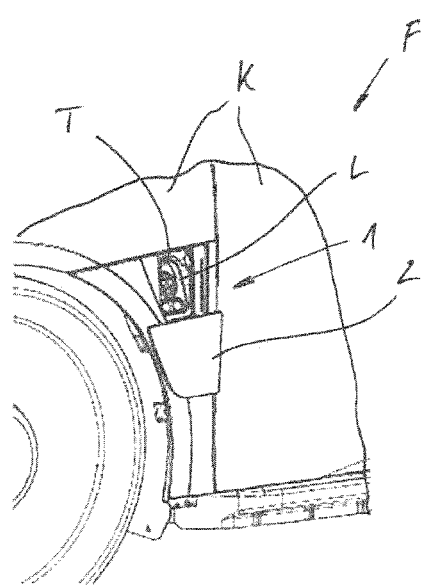
FIG. 2 shows, in an enlarged representation, the device of FIG. 1 in an open position of the cover part.
Figure 3:
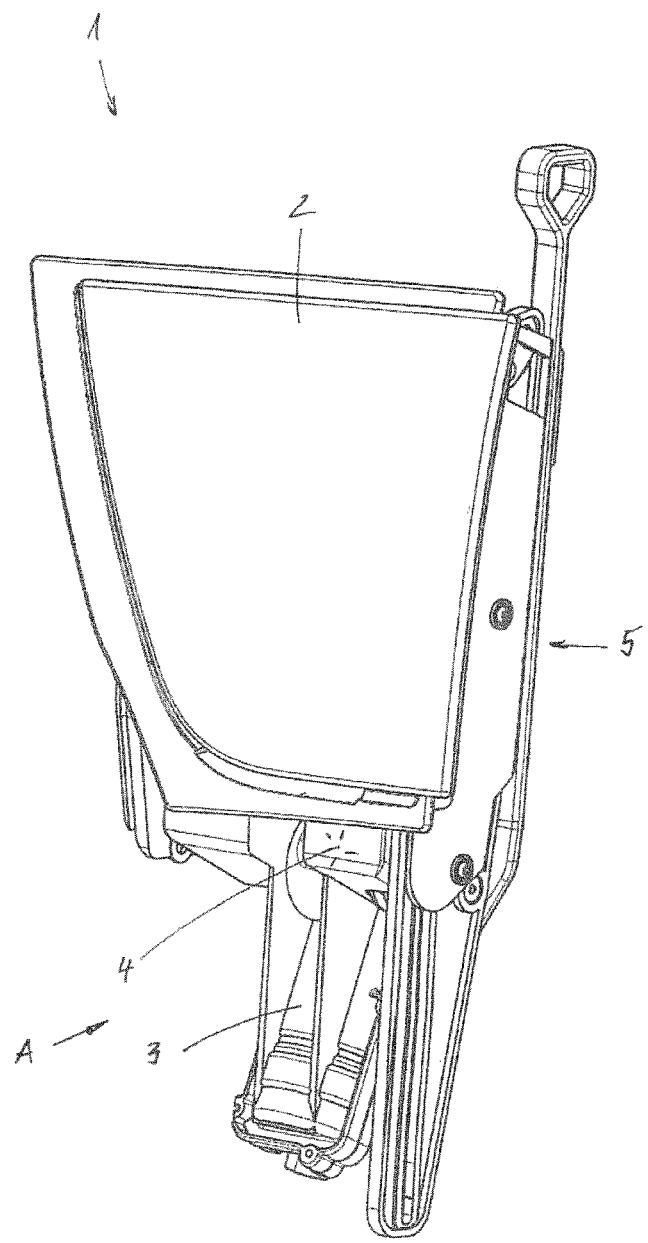
FIG. 3 shows, in an enlarged perspective representation, the device of FIGS. 1 and 2.
Figure 4:
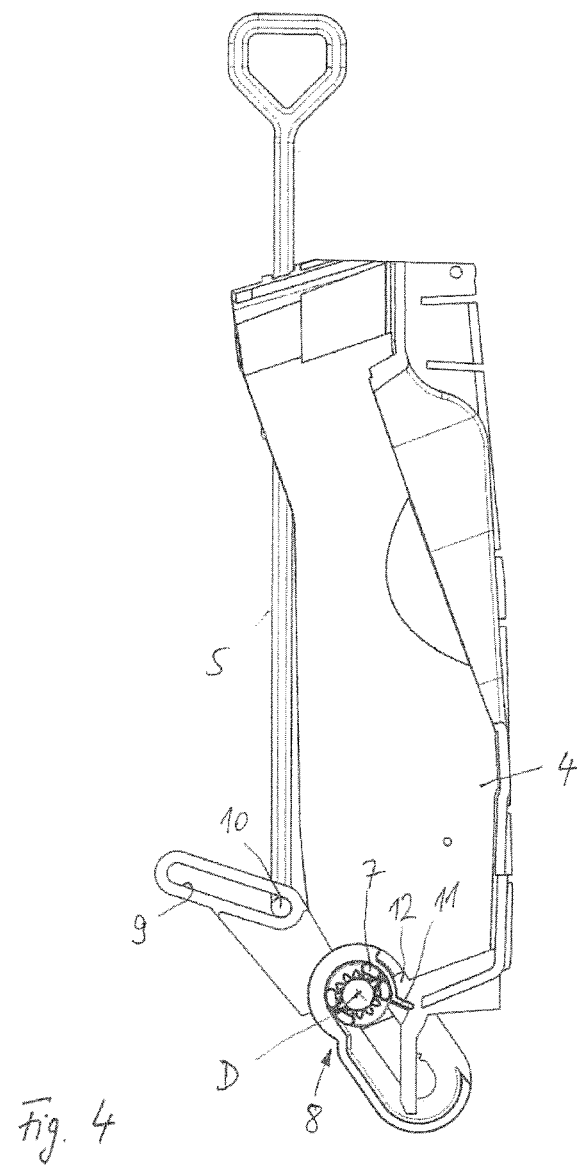
FIG. 4 shows a partial region of the device of FIG. 3 in a deactivation position of an emergency actuation device.
Figure 5:
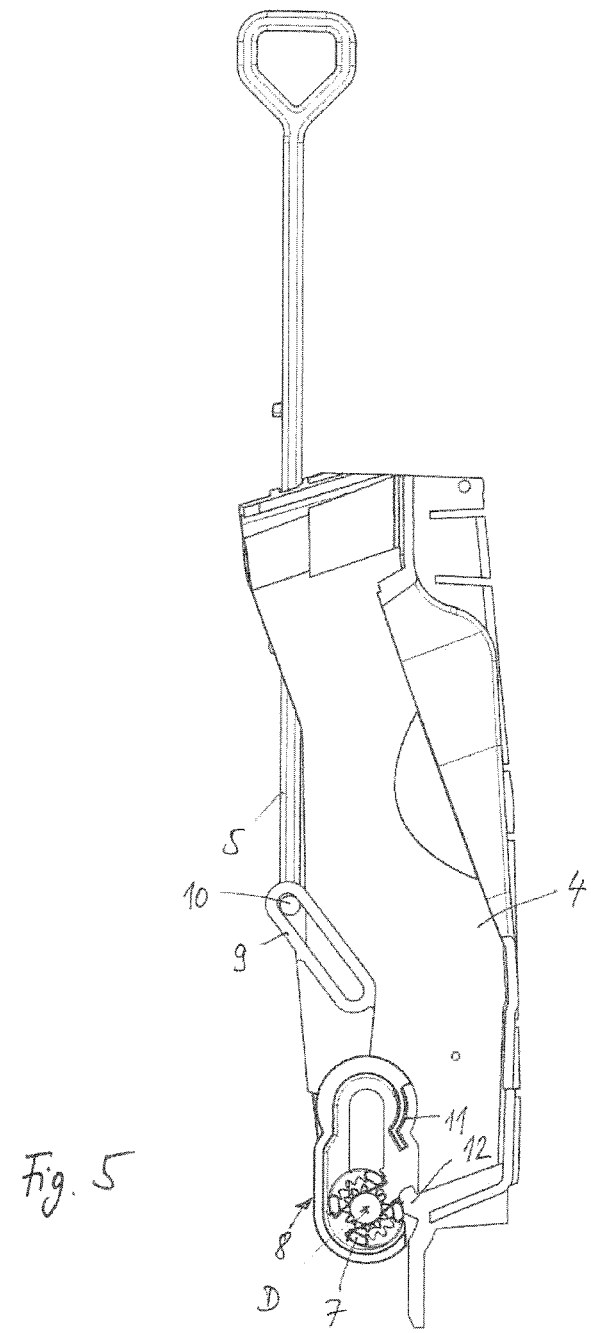
FIG. 5 shows the representation of FIG. 4, but in an activation position of the emergency actuation device.

The transmission 6 comprises a not otherwise designated output sprocket, which meshes also in a manner not otherwise shown with a toothed rack segment, arranged on a guide carriage, which in turn carries the cover part 2. The guide carriage is mounted to travel along a housing-fixed guiding mechanism of a device housing 4. The device housing 4 in the state fixed to the vehicle per FIGS. 1 and 2 is firmly connected to the vehicle chassis K in the area of the body recess T.

A drive shaft of the drive mechanism A is mounted rotatably about an axis of rotation D in the device housing 4. The coupling mechanism 7 is configured as a form fit coupling and produces a form-fit connection about the axis of rotation D between the output sprocket and a drive pinion of the drive shaft of the transmission 6, the output sprocket and the drive pinion being positioned and driven coaxially to the axis of rotation D. In other words, the form fit coupling is arranged between the drive shaft and the coaxially positioned power takeoff shaft. The form fit coupling, i.e., the coupling mechanism 7, comprises two coupling jaws, which are mounted movably in a limited manner in the radial direction of the axis of rotation D relative to the drive shaft and thus relative to the axis of rotation D, and are connected to the drive shaft in a permanently torque-free manner. The coupling jaws are outwardly pretensioned in the radial direction by means of a spring assembly. Corresponding spring elements of the spring assembly are configured as leaf springs, which produce a permanent radially outward loading on the coupling jaws. Upon a corresponding outward displacement of the coupling jaws, the power takeoff shaft and thus the output sprocket are lifted, so that the form fit between the coupling jaws and the drive shaft is broken. The coupling mechanism 7 is thus converted to the separation state.

In order to maintain the form fit coupling in the coupling state, the emergency actuation device comprises a clamping housing 8, which is provided with an elastically resilient clamping tab 11 having a circular arc shape and detent-like action, which together with corresponding clamping sections of the clamping housing 8 holds the coupling jaws of the coupling mechanism 7 in the coupling state, in which the drive mechanism A exerts a driving force transmission on the guide carriage of the cover part 2. This coupling state is shown by means of FIGS. 4, 6, 7 and 9, 10.

In order to prevent the clamping tab 11 in the coupling state of the coupling mechanism 7 from being forced unintentionally outward on account of external loads occurring, so that the clamping housing 8 can be displaced in the vertical direction relative to the axis of rotation D and the operative connection between the drive mechanism A and the cover part 2 is unintentionally broken, an additional securing mechanism is associated with the clamping housing 8 as part of the emergency actuation device, having a securing cam 12 arranged in a fixed manner on the device housing 4. In the securing state (see in particular FIG. 6), in which the clamping tab 11 is blocked by the securing cam 12 against an outward elastic expansion, the clamping housing 8 is rotated by an acute angle relative to the vehicle vertical direction. In this position, the emergency actuation device is deactivated. The clamping housing 8 has a carrier extension molded as a single piece above the clamping section surrounding the coupling mechanism 7, which is provided with a connecting link guide 9, being oriented upward at an acute angle relative to the lengthwise extension of the clamping housing 8. In this connecting link guide 9 there is guided a link pin 10, which is rotatable and lengthwise displaceable, so that the connecting link guide 9 and the link pin 10 form a sliding joint for the emergency actuation device. The link pin 10 is continued in the upward direction by a longitudinally extending activating element 5, which is provided with an activating handle at one upper end face. The activating element 5 is likewise part of the emergency actuation device and is mounted to move in a linear manner relative to the device housing 4 in the vehicle vertical direction.

Figure 6:
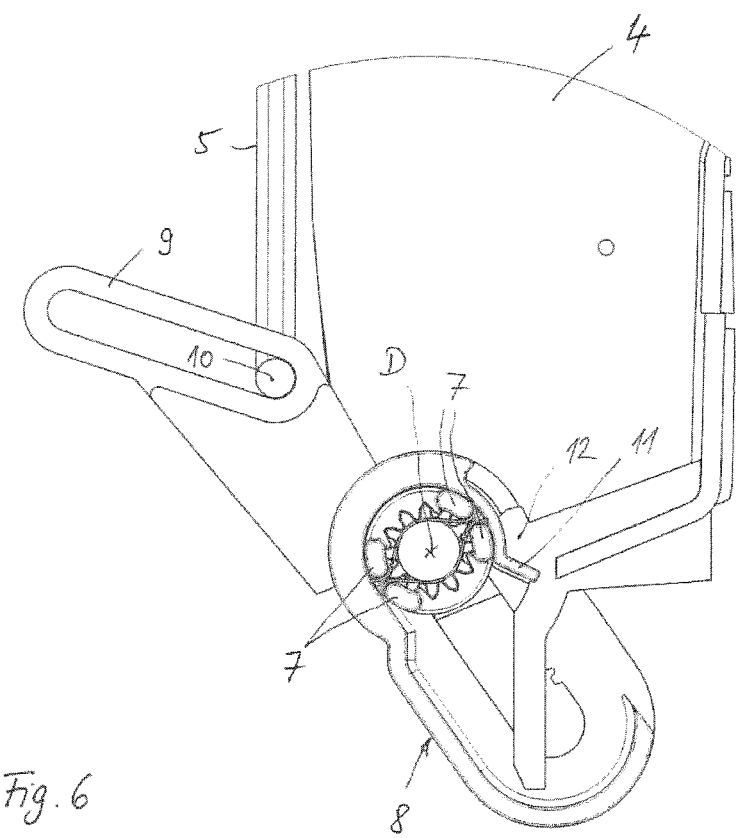
FIG. 6 shows, in an enlarged representation, a partial region of the device of FIG. 4.
Figure 7:
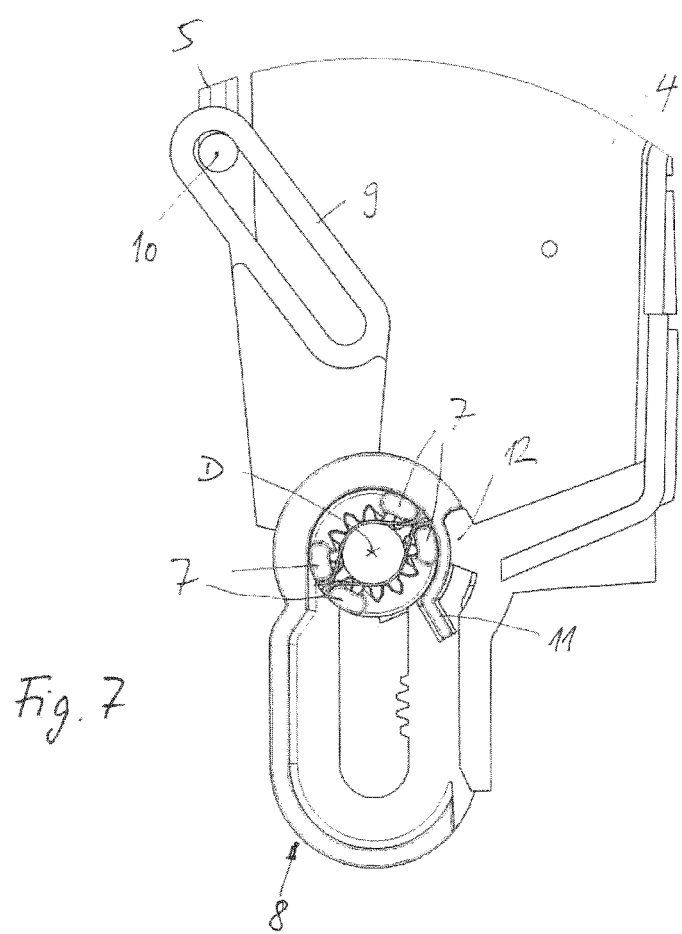
FIG. 7 shows the partial region of FIG. 6, but in an activation position of the emergency actuation device.
Figure 8:
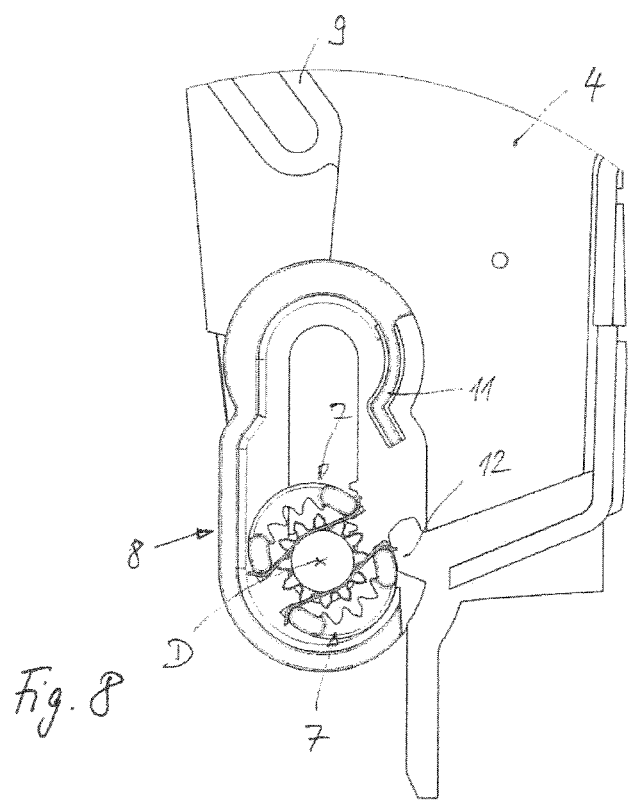
FIG. 8 shows the representation of FIG. 7 with a deactivated coupling mechanism and thus an activated emergency actuation device.

Now, starting from the deactivation position of the emergency actuation device per FIG. 6 or FIG. 9, if the activating element 5 is pulled manually upward in the vehicle vertical direction, the sliding joint necessarily produces a downward swiveling of the clamping housing 8 of the emergency actuation device in the clockwise direction (per FIG. 6) about the axis of rotation D, so that the clamping tab 11 is also necessarily moved downward by its circular arc outer contour concentric with the axis of rotation D along the fixed securing cam 12 of the securing mechanism. In this position (FIG. 7), the clamping tab 11 can thus already yield elastically and radially outward as soon as the clamping housing 8 is pulled upward with respect to the coupling mechanism 7. A manual upward pulling on the activating element 5, due to the link pin 10 having arrived at the upper end of the connecting link guide, necessarily produces an upward tensile stress on the clamping housing 8 in the vehicle vertical direction, so that the coupling mechanism 7 emerges from the grip of the clamping section and the clamping tab 11 of the clamping housing 8 (see FIG. 5 and FIG. 8 as well as FIG. 11). In this position, the coupling mechanism 7 is lifted, since the leaf springs press the coupling jaws radially outward. The clamping housing 8 of the emergency actuation device, similar to the device of DE 10 2020 209 609 A1, is provided with a toothing in the area of the oblong hole-like inner contour of the clamping housing 8, which drives the output sprocket upon upward displacement movement of the clamping housing 8 and thus moves the cover part into an open position through the guide carriage and the corresponding toothed rack segment. This corresponds to the activating function of the emergency actuation device.

In order to convert the emergency actuation device from the activated position back to its deactivation position, the activating element 5 is once again pressed downward in the vehicle vertical direction, whereby at first a linear movement occurs again through the sliding joint 9, 10 on the clamping housing 8 downward along the oblong hole of the clamping housing 8 until the coupling mechanism 7 has again dipped into the clamping sections and the clamping tab 11 of the clamping housing 8 and the coupling mechanism 7 is once again coupled in form fit with the drive mechanism A. Upon further exerting of linear pressure on the activating element 5 downward in the vehicle vertical direction, the clamping housing 8 is necessarily swiveled once more about the axis of rotation D in the counterclockwise direction (from FIG. 7 in the direction of FIG. 6), so that the securing cam 12 of the securing mechanism again blocks the clamping tab 11 radially outward. In this position, a loosening of the coupling mechanism 7 from the drive mechanism A is precluded. This position once again corresponds to the deactivation position of the emergency actuation device.

The invention claimed is:

1. A device for closing and releasing a power charging port of a motor vehicle, the device having a cover part, which cover part can be moved by a guiding mechanism fixed to the vehicle in an installed and ready to operate condition between a closed position closing the power charging port and an open position releasing the power charging port, the device having a manually operable emergency actuation device for moving the cover part into the open position, the device having a drive mechanism for powered control of the movement of the cover part between the closed position and the open position, the drive mechanism having a power transmission, the device having a coupling mechanism for activating the emergency actuation device and for deactivating the drive mechanism, wherein the coupling mechanism is mechanically and operatively connected to the emergency actuation device, the device having a mechanical securing mechanism and the coupling mechanism is associated with the mechanical securing mechanism, the mechanical securing mechanism cooperating with the emergency actuation device such that, when the emergency actuation device is deactivated, the mechanical securing mechanism produces an additional form fit to secure the power transmission of the drive mechanism, wherein the additional form fit is lifted upon activation of the emergency actuation device, wherein the emergency actuation device comprises a clamping housing enclosing the coupling mechanism in a force-limited manner, the clamping housing being mounted for swiveling movement about a coupling axis of rotation, the emergency actuation device further including a manually graspable activating element and the clamping housing is coupled to the manually graspable activating element to cause a swiveling movement of the clamping housing.

2. The device according to claim 1, wherein the emergency actuation device and the mechanical securing mechanism are arranged movably relative to each other in order to produce or release the additional form fit by the mechanical securing mechanism.

3. The device according to claim 2, wherein the mechanical securing mechanism is fixed in place and the emergency actuation device is mounted movably between an activation position and a deactivation position.

4. The device according to claim 1, wherein the manually graspable activating element is coupled by a sliding joint to the clamping housing.

5. The device according to claim 4, wherein the sliding joint comprises a connecting link guide oriented, at least for a portion, at a slant to a lengthwise extension of the clamping housing of the emergency actuation device.

6. The device according to claim 1, wherein the clamping housing comprises at least one elastically resilient clamping tab radially enclosing a portion of an outside of the coupling mechanism and the mechanical securing mechanism comprises a securing cam, the securing cam making contact, radially, with an outside of the clamping tab such that, in a deactivation position of the emergency actuation device, the clamping tab is blocked by a form fit against a radial expansion to an outside, and, in an activation position of the emergency actuation device, the clamping tab is released and undergoes an outward radial-elastic expansion.

7. The device according to claim 4, wherein the clamping housing comprises at least one elastically resilient clamping tab radially enclosing a portion of an outside of the coupling mechanism, and the mechanical securing mechanism comprises a securing cam, the securing cam making contact, radially, with an outside of the clamping tab such that, in a deactivation position of the emergency actuation device, the clamping tab is blocked by a form fit against a radial expansion to an outside, and, in an activation position of the emergency actuation device, the clamping tab is released and undergoes an outward radial-elastic expansion.

8. The device according to claim 5, wherein the clamping housing comprises at least one elastically resilient clamping tab radially enclosing a portion of an outside of the coupling mechanism, and the mechanical securing mechanism comprises a securing cam, the securing cam making contact, radially, with an outside of the clamping tab such that, in a deactivation position of the emergency actuation device, the clamping tab is blocked by a form fit against a radial expansion to an outside, and, in an activation position of the emergency actuation device, the clamping tab is released and undergoes an outward radial-elastic expansion.

* * * * *